(12) United States Patent
Ohnishi

(10) Patent No.: US 8,149,678 B2
(45) Date of Patent: Apr. 3, 2012

(54) DIFFRACTION GRATING, OPTICAL PICKUP AND OPTICAL DISC DEVICE

(75) Inventor: Kunikazu Ohnishi, Yokosuka (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 286 days.

(21) Appl. No.: 12/417,037

(22) Filed: Apr. 2, 2009

(65) Prior Publication Data

US 2010/0034071 A1 Feb. 11, 2010

(30) Foreign Application Priority Data

Aug. 6, 2008 (JP) ................................ 2008-202542

(51) Int. Cl.
*G11B 7/135* (2012.01)
(52) U.S. Cl. .................................................. 369/112.15
(58) Field of Classification Search ......................... None
See application file for complete search history.

(56) References Cited

U.S. PATENT DOCUMENTS

| | | | |
|---|---|---|---|
| 6,414,930 B1 * | 7/2002 | Shiono et al. ............ | 369/112.03 |
| 6,418,098 B1 * | 7/2002 | Yamamoto et al. ........ | 369/44.41 |
| 7,558,162 B2 * | 7/2009 | Kadowaki et al. ......... | 369/44.12 |
| 7,706,236 B2 * | 4/2010 | Arai .......................... | 369/112.05 |
| 2002/0150008 A1 | 10/2002 | Shimano et al. | |
| 2004/0196771 A1 * | 10/2004 | Shimano et al. ......... | 369/112.03 |
| 2004/0257960 A1 * | 12/2004 | Fujii ........................ | 369/112.05 |
| 2005/0030877 A1 * | 2/2005 | Horiyama ................ | 369/112.06 |
| 2005/0185539 A1 * | 8/2005 | Shimano et al. .......... | 369/44.37 |
| 2005/0199778 A1 * | 9/2005 | Kadowaki et al. ......... | 250/201.5 |
| 2006/0158996 A1 * | 7/2006 | Kim ......................... | 369/112.03 |
| 2007/0081431 A1 | 4/2007 | Watanabe et al. | |
| 2007/0133374 A1 * | 6/2007 | Arai ........................ | 369/112.05 |
| 2008/0310283 A1 * | 12/2008 | De Wit et al. ............ | 369/112.05 |
| 2009/0147658 A1 * | 6/2009 | Katayama ................ | 369/112.03 |
| 2010/0020670 A1 * | 1/2010 | Yamazaki ................ | 369/109.01 |
| 2010/0034071 A1 * | 2/2010 | Ohnishi .................... | 369/112.03 |
| 2010/0135145 A1 * | 6/2010 | Sato ........................ | 369/112.08 |
| 2010/0157778 A1 * | 6/2010 | Shimada et al. ......... | 369/112.12 |

FOREIGN PATENT DOCUMENTS

| | | |
|---|---|---|
| CN | 1226725 | 8/1999 |
| CN | 1784722 | 6/2006 |
| JP | 2005-203090 | 7/2005 |

* cited by examiner

*Primary Examiner* — Peter Vincent Agustin

(74) *Attorney, Agent, or Firm* — Antonelli, Terry, Stout & Kraus, LLP.

(57) ABSTRACT

Undesired disturbance components leak eventually into various detection signals and reproduction signals as stray optical beams reflected from recording layers other than a reproduction layer overlap with signal beams on a light reception surface of an optical detector and interference occurs between them when an optical disc having multi-layered recording layers is reproduced. A diffraction grating having a specific grating groove pattern is arranged immediately ahead of an optical detector or in a return optical path. Such optical unit averages the disturbance components resulting from interference between a signal beam and a stray beam and can satisfactorily improve influences of leak.

4 Claims, 10 Drawing Sheets

(A) WHEN L0 LAYER IS USED AS SIGNAL READOUT LAYER (B) WHEN L1 LAYER IS USED AS SIGNAL READOUT LAYER

DIFFRACTION GRATING, OPTICAL PICKUP AND OPTICAL DISC DEVICE

INCORPORATION BY REFERENCE

The present application claims priority from Japanese application JP2008-202542 filed on Aug. 6, 2008, the content of which is hereby incorporated by reference into this application.

BACKGROUND OF THE INVENTION

This invention relates to a diffraction grating having a predetermined grating groove pattern, an optical pickup equipped with the diffraction grating and an optical disc device having the optical pickup mounted thereto. More particularly, the invention relates to optical means effective for reproducing information signals from an optical information recording medium (hereinafter called simply an "optical disc") having multi-layered signal recording layers or recording the information signals to the optical disc.

A multi-layering technology of signal recording layers has been widespread quickly in recent years as means for achieving a large recording capacity of optical discs. The multi-layering technology of the signal recording layers stacks a plurality of signal recording layers with a predetermined layer gap δ among them inside the same optical disc and can substantially increase more than double the recording capacity of single-layered optical discs of the prior art.

To detect highly precisely and stably an information signal from a desired signal recording layer inside such a multi-layered optical disc and a focusing error signal as well as a tracking error signal for converging highly precisely and stably a laser beam to a predetermined recording track of the recording layer, means are essentially necessary for satisfactorily removing the influences of unnecessary reflected beams from recording layers other than the desired signal recording layer (these unnecessary reflected beams from other layers will be hereinafter called "stray optical beams" for short). Several optical technologies and devices as optical means directed to removing the stray optical beams of the multi-layered optical discs have already been disclosed in JP-A-2005-203090, for example.

SUMMARY OF THE INVENTION

Means for removing the stray optical beans according to the prior art typified by the patent document described above cannot exhibit sufficient performance for removing the stray optical beams for obtaining excellent readout signals or control signals. Moreover, an optical detector fails to receive not only the stray optical beams but also a part of the reproduced optical beams of the information readout signal. Consequently, the problems of degradation of quality of the reproduced information signal and the drop of light utilization efficiency occur, to the contrary.

In view of the problem described above, it is an object of the invention to provide an optical pickup and an optical disc device each of which can satisfactorily remove the influences of the stray optical beams that otherwise invite the problems such as quality degradation of reproduced information signals during reproduction of a multi-layered optical disc and the drop of light utilization efficiency, and which has high reliability.

The object described above can be accomplished by employing the means disclosed in the appended claims.

The invention can provide an optical pickup and an optical disc device each having high reliability.

Other objects, features and advantages of the invention will become apparent from the following description of the embodiments of the invention taken in conjunction with the accompanying drawings.

DETAILED DESCRIPTION OF THE EMBODIMENTS

Concrete constructions for executing the invention will be hereinafter explained.

Embodiment 1

Figure 1:
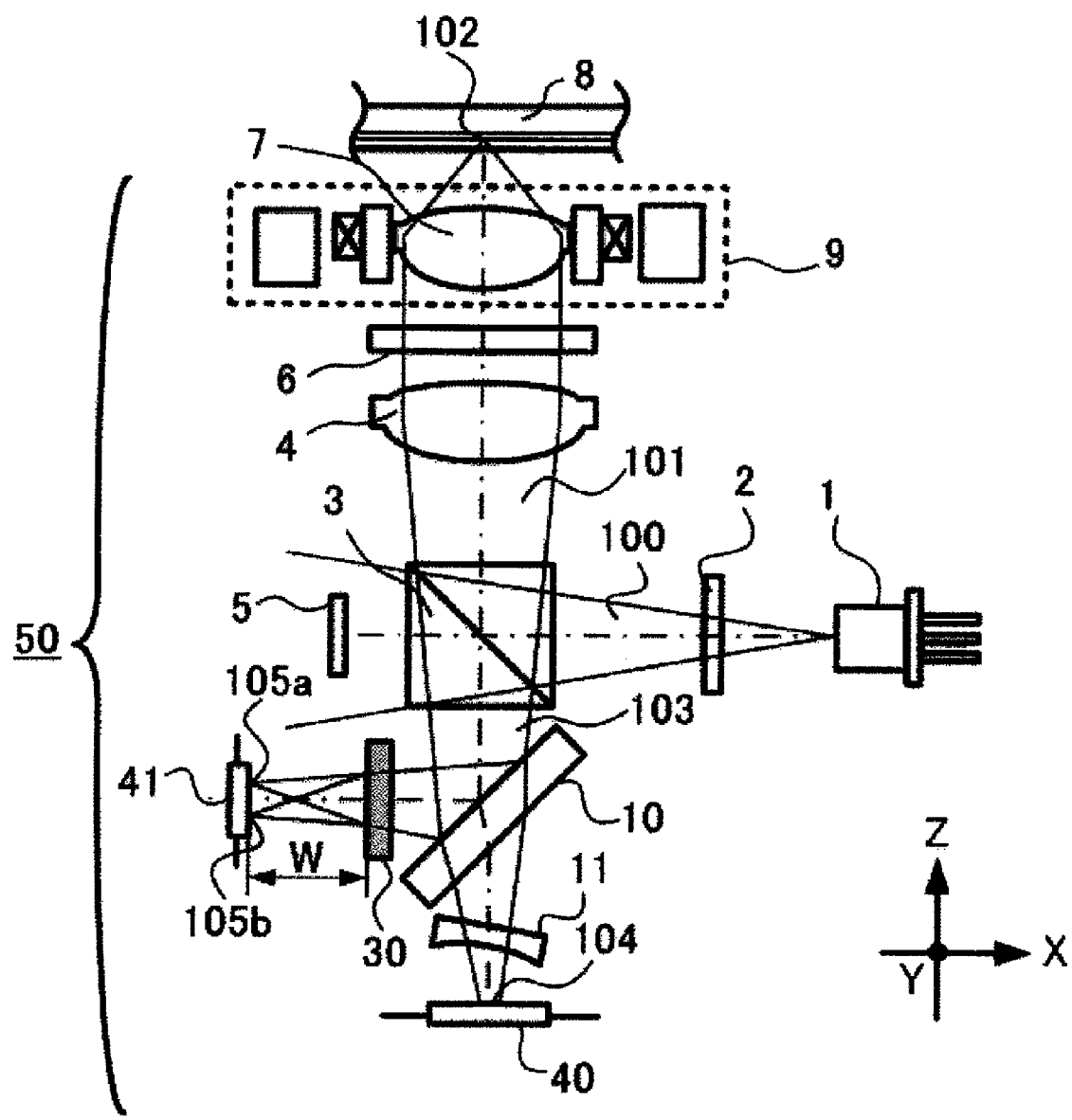
FIG. 1 is a rough front view showing an optical pickup according to a first embodiment of the invention.

A construction of an optical pickup according to the first embodiment of the invention will be explained first with reference to the accompanying drawings. FIG. 1 shows schematically a construction of an optical system of the optical pickup 50 according to the first embodiment of the invention. Referring to FIG. 1, reference numeral 1 denotes a semiconductor laser light source emitting an optical beam of a wavelength of a 405 nm band, for example.

The optical beam reaches a wavelength plate 2 immediately after it outgoes from the semiconductor laser light source 1. The wavelength plate 2 is disposed for the purpose of setting a reflection factor and a transmission factor to desired ratios when an optical beam 100 incident into a polarized beam splitter 3 (hereinafter called a "PBS", for short) subsequently after transmission through the wavelength plate 2 is split into a an optical beam 101 of an S polarization component reflected on a reflection surface inside the PBS and incident into a collimator lens 4 and an optical beam of a P polarization component that passes through the reflection surface inside the PBS 3 and is incident into an optical detector 5 for monitoring light power (hereinafter called "front monitor" for short) by controlling a polarizing direction of the optical beam 100 incident into the PBS 3.

Next, the optical beam 101 reflected by the PBS 3 is converted from a divergent optical beam to a substantially parallel beam by the collimator lens 4, further passes through a ¼ wavelength plate 6 where it is converted to a circularly-polarized beam, and is thereafter incident into an objective lens 7. The objective lens 7 has the function of converging incident beams to a predetermined signal recording layer inside a multi-layered optical disc 8 having a plurality of signal recording layers formed thereon such as a BD (Blu-ray Disc) 2-layer disc to form a converged spot 102 when the optical beams of the 405 nm band are incident as the parallel beams to the objective lens 7.

Additionally, this objective lens 7 is held by an actuator 9 and when a predetermined objective lens position control signal is supplied to the actuator 9, position control of the objective lens 7 can be made in a radial direction and a direction of the optical axis substantially perpendicular to the disc surface.

Illumination light intensity of the converged spot 102 formed on a predetermined signal recording layer inside the optical disc 8 is controlled on the basis of the light power signal detected by the front monitor 5.

The optical beam reflected on the signal recording layer inside the optical disc 8 travels on the same optical path as the outgoing optical path but in a reverse direction, passes through the objective lens 7 and the ¼ wavelength plate 6 and is converted to a polarizing direction (P polarized light) orthogonal to the polarizing direction (S polarized light) of the outgoing optical beam 101. The optical beam is then converged from the parallel optical beams to a converged optical beam by the collimator lens 4 and again reaches the PBS 3. The beam passes through this PBS 3 at a transmission factor of about 100% unlike the outgoing optical path and is then incident into a flat sheet type half mirror 10 arranged at an angle of inclination of about 45° to the optical path as shown in the drawings.

The optical beam is split by the half mirror 10 at a predetermined light power ratio into an optical beam that passes through the half mirror 10, is converged on a predetermined light reception surface inside the optical detector 40 through the detection lens 11, forming the detected optical spot 104 and into another optical beam that is incident into the diffraction grating 30 after reflected by the half mirror 10, is split into two optical beams by this diffraction grating 30, is converged on the light reception surface inside the light detector 41, forming the detected light sports 105*a* and 105*b*.

A focus control signal is detected by an astigmatism system and a tracking control signal is detected by a push-pull system from the photoelectric conversion signal detected from the detected light sport 104 illuminated to each light reception surface of the optical detector 40, for example. Each control signal is supplied to the actuator 8 and position control of the objective lens 7 is executed.

Since both of the astigmatism system and the push-pull system are known control signal detection systems, more detailed explanation will be herby omitted. In addition, the invention is not specifically limited to the position control signal for the objective lens 7 by the astigmatism system and the push-pull system but can quite naturally be applied to any other known position control signal detection systems.

On the other hand, an information signal recorded on the object signal recording layer is read out from the photoelectric conversion signal detected from the detected optical spots 105*a* and 105*b* illuminated to the optical detector 41. The construction of the diffraction grating 30 arranged immediately before this optical detector 41, its function and its effects will be explained later in further detail.

The problem that arises when the multi-layered optical disc described above is reproduced will be explained with reference to FIG. 2 prior to the detailed explanation of the invention. Incidentally, a two-layered optical disc in which only two signal recording layers are stacked inside the disc will be explained as the most simplified example.

Figure 2A:
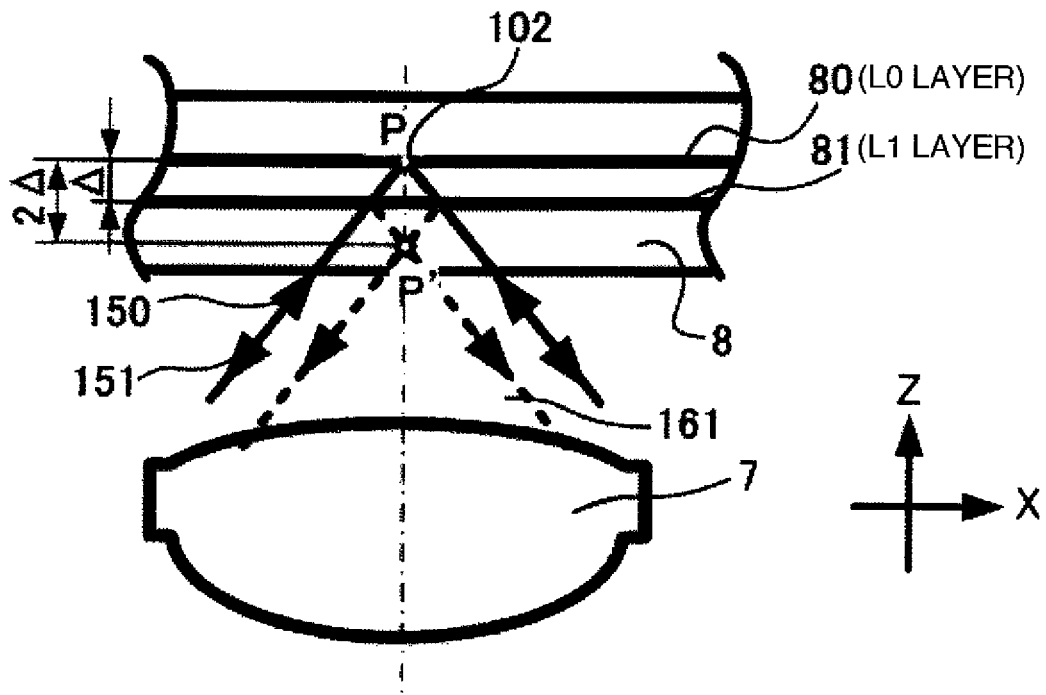
FIGS. 2A and 2B are enlarged views of main portions that are useful for explaining a mechanism of the occurrence of stray optical beams in a two-layered disc.
Figure 2B:
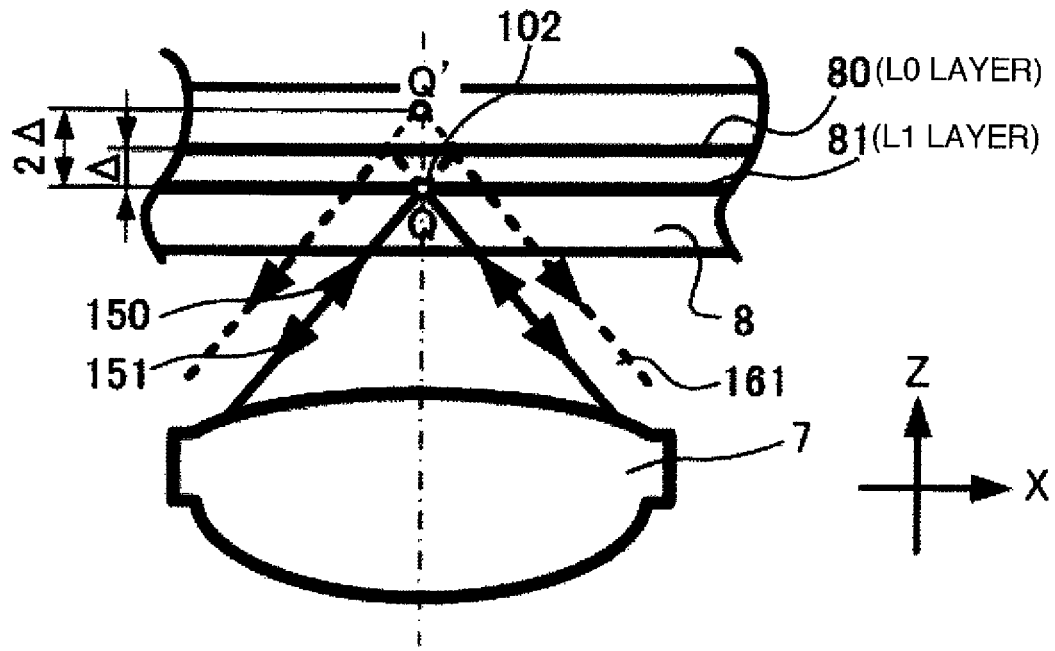

Reproduction of the information signal from the two-layered optical disc includes the following two cases as shown in FIGS. 2A and 2B.

The first is the case where a signal recording layer 80 positioned deeper in the optical disc 8 relative to the objective lens 7 (which will be hereinafter called ordinarily "L0 layer") is a reproduction object layer and an optical spot 102 is formed at a point P on the L0 layer by converging the optical beam 150 (this case will be called "case A"). The second is the case where a signal recording layer 81 on the front side relative to the objective lens 7 (this recording layer will be hereinafter called ordinarily "L1 layer") is the reproduction object layer and the optical spot 102 is formed at a point Q on the L1 layer by converging the optical beam 150 (this case will be called "case B").

In either case, the optical beam converged to the predetermined position on the reproduction object layer (point P or Q in FIGS. 2A and 2B) is reflected by each associated reproduction object layer and travels back reversely as the signal optical beam 151 in the same optical path as the outgoing optical path and again reaches the objective lens 7. After transmitting through the objective lens 7, the optical beam 151 travels in the return optical path, is finally converged on the light reception surface inside each optical detector 40 and 41 as shown in FIG. 1 and forms the detected optical spots 104 and 105*a*, 105*b*.

On the other hand, a part of the converged beam 150 is reflected on the other signal recording layer that is not the reproduction object layer (L1 layer 81 in the case A and L0 layer 80 in the case B; the signal recording layer that is not the reproduction object layer will be hereinafter called "reproduction non-object layer") and reaches as the stray optical beam 161 the objective lens 7 in the same way as the signal optical beam 151. In the optical pickup according to the prior art, the stray optical beam 161 passes through the object lens 7, travels in the return optical path in the same way as the signal optical beam 151, is finally converged on the light reception surface inside the optical detectors 40 and 41 and is illuminated in such a fashion as to overlap with the detected optical spots 104 and 105, 105*b* with the stray optical beam being quite blurred and widened, as compared to these detected optical spots.

(Incidentally, the optical spot formed when the stray optical beam reflected from the reproduction non-object layer is condensed on the light reception surface of the optical detector will be hereinafter called "stray optical spot" for short.)

When such a two-layered disc is reproduced, the stray optical spots overlap with the detected optical spots 104 and 105*a*, 105*b* illuminated on each light reception surface. Interference occurs between the detected optical spot and the stray optical spot and invites the occurrence of a dark and bright interference fringe pattern on each light reception surface. An unnecessary change of light power then occurs in the interference fringe pattern on each light reception surface owing to factors such as up-and-down movement of the disc, the change of the gap between the recording layers, and so forth, with the result of the overlap of an unnecessary change component and a noise component with the photoelectric conversion signal detected on each light reception surface. These unnecessary change component and noise component remarkably deteriorate signal quality of the information signal reproduced and detected from each photoelectric conversion signal and the focus and tracking control signals.

The invention provides optical means for removing or effectively reducing the degradation of signal quality of the information reproduction signal and each control signal resulting from the interference between the detected optical spot and the stray optical spot.

The explanation given above deals with the two-layered disc as the most simplified example. In the multi-layered discs having three or more layers, too, the interference occurs between the detected optical spot and the stray optical spot owing to the same mechanism and degradation of quality of various detection signals occurs. Moreover, adverse influences are greater and more complicated in high multi-layered discs having three or more layers than in the two-layered discs because the number of the reproduction non-object layers as the cause of the occurrence of the stray optical spot becomes 2 or more.

To solve this problem, the embodiment arranges a diffraction grating in the optical path between the half mirror 10 and the optical detector 41 that is for reproducing the information signal.

Figure 3:
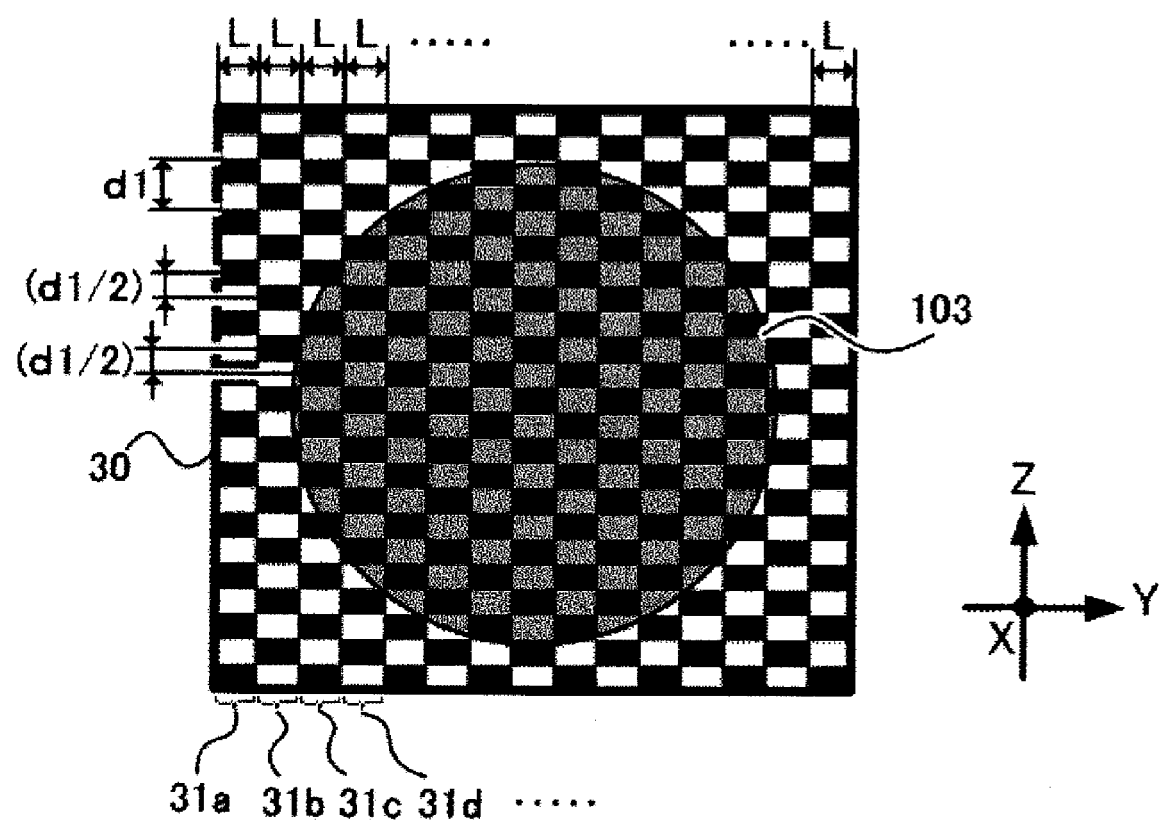
FIG. 3 is a schematic plan view showing a grating groove pattern of the diffraction grating in the first embodiment of the invention.

The diffraction grating 30 has a grating groove pattern that is clearly different from ordinary diffraction gratings. An example of the grating groove patterns is shown in FIG. 3. In this diffraction grating 30, a plurality of rectangular (or strip-like) fine regions 31a, 31b, 31c, 31d having a predetermined with L are juxtaposed in a horizontal direction (Y-axis direction) of the sheet of the drawing as shown in FIG. 3 and recesses or protuberances of fine belt-like grating grooves are periodically arranged with a predetermined cycle d1 in a perpendicular direction (Z-axis direction) to the sheet of the drawing inside each fine region. (The portions smeared out in black in the drawing correspond to the grating grooves). Moreover, pairs of rectangular fine regions adjacent to one another are arranged with a phase difference of about ½ of the cycle of the grating grooves, that is, about d½. Additionally, the groove depth of the diffraction grating 30 and its groove width are set such that the light power of the ±1-order diffraction light is about 40 to 50% of incident light and light power of the 0-order light passing "as is" through the diffraction grating 30 becomes substantially 0.

When the return path beam 103 reflected from the optical disc 30 is incident to the diffraction grating 30, the beam is split by the diffraction grating 30 into two beams, that is, a +1-order diffraction light and −1-order diffraction light, in the perpendicular direction of the sheet of the drawing (Z-axis direction) and each beam is converged on the light reception surface of the optical detector 41 and forms the detected optical spots 105a and 105b. The space S of the illumination positions between the detected optical spots 105a and 105b is determined substantially by the grating groove cycle d1 of the diffraction grating 30 and the optical distance W between the diffraction grating 30 and the light reception surface of the optical detector 41 and is preferably from several microns to several tens of microns.

Figure 4:
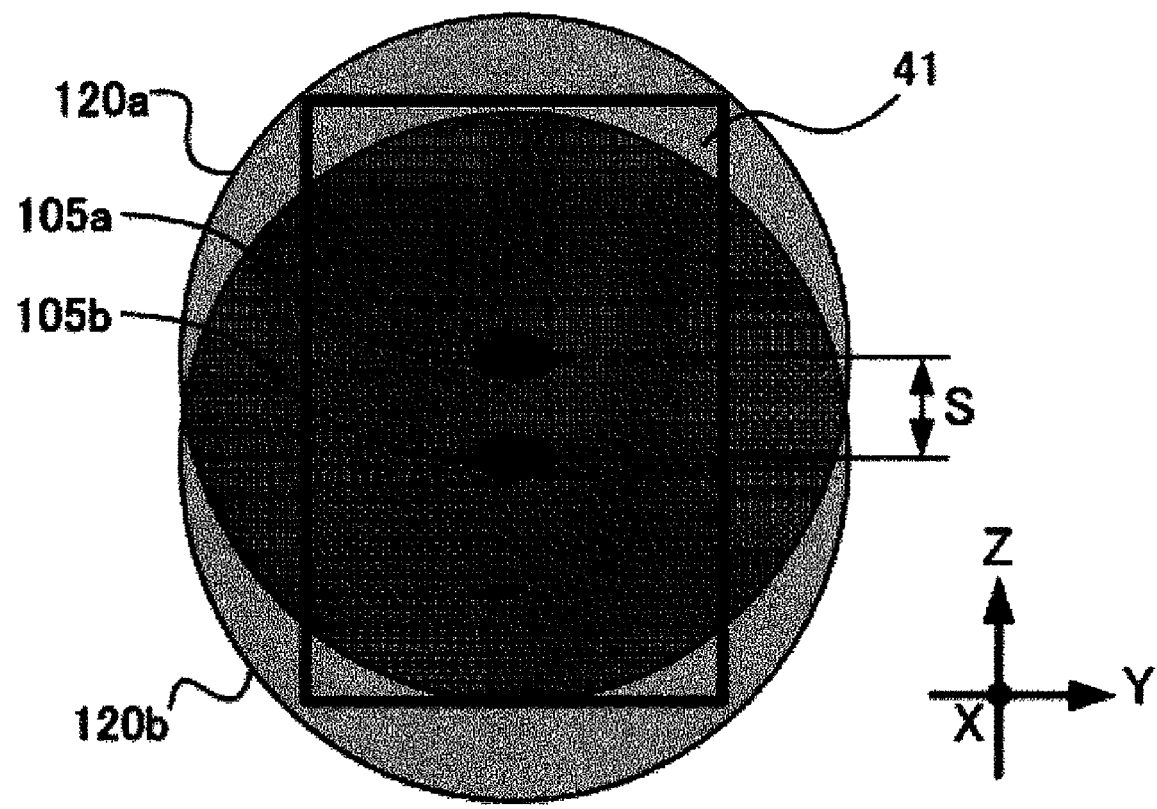
FIG. 4 is a schematic plan view showing the state of detected optical spots and stray optical spots on a light reception surface of an optical detector in the embodiment of the invention.

On the other hand, the stray optical beam from the reproduction non-object layer is also incident into the diffraction grating 30 and is similarly split into two optical beams, that is, the +1-order diffraction light and the −1-order diffraction light, separately from the detected optical spots 105a and 105b. These beams illuminate the light reception surface of the optical detector 41 in such a fashion as to overlap with the detected optical spots 105a and 105b with the beams being quite blurred and widened, as compared to the detected optical spots 105a and 105b, like the stray optical spots 120a and 120b shown in FIG. 4.

Because the diffraction grating 30 has the specific grating groove pattern described above, however, the stray optical spots 120a and 120b have the feature such that their wave front (phase surface) periodically has a concavo-convex shape and the phase difference between the protrusion and the recess of the wave front corresponds to about ½ wavelength, unlike the optical spot split and formed by ordinary diffraction gratings.

When the stray optical spots 120a and 120b overlap with the detected optical spots 105a and 105b under the state where the stray optical spots 120a and 120b having the wave front having concavo-convexes appearing finely and periodically are spaced apart from each other by the predetermined space S, the bright portions and the dark portions formed by the interference become those regions which are divided extremely finely even when such an interference occurs and are dispersed at random inside the optical spot. As a result, these local changes of light power is averaged or smoothed out.

Therefore, the photoelectric conversion signal outputted from the optical detector 41 does not contain the light power change component owing to the interference between the detected optical spot and the stray optical spot and only the reproduction signal detected from the total light power change of the detected optical sports 105a and 105b are extracted satisfactorily.

The width L of the rectangular (or strip-like) fine regions 31a, 31b, 31c and 31d in the embodiment shown in FIG. 3 must be sufficiently smaller than the diameter of the section of the luminous flux of the optical beam 103 incident into the diffraction grating 30. More concretely, the width L is preferably from several tens of microns to 100 microns.

In the embodiment shown in FIG. 1, the diffraction grating 30 is shown arranged immediately ahead of the optical detector 41 for reproducing the information signal. However, the invention is not quite naturally limited to this arrangement and the diffraction grating 30 may be arranged in the optical path between the PBS 3 and the half mirror 10, for example. According to this arrangement, the averaging effect of the light power change due to the interference between the detected optical spot and the stray optical spot owing to the interference occurs on the light reception surface of not only the optical detector 41 but also of the optical detector 40. In consequence, the unnecessary change component resulting from the interference with the stray optical beam and the noise component can be satisfactorily removed for not only the reproduced information signal but also various kinds of control signals, such as the focusing error signal and the tracking error signal.

As described above, the undesired light power change resulting from the interference between the detected optical spot and the stray optical spot can be smoothed out in the diffraction grating 30 by dividing the diffraction grating 30 into the rectangular (strip-like) fine regions as shown in FIG. 3 and periodically arranging, for example, the grating grooves under the state where their phase is deviated in about the half cycle between the adjacent fine regions. As a result, the unnecessary change component and the noise component appearing in each detection signal when the multi-layered optical disc is reproduced by using the conventional optical pickup can be removed satisfactorily.

Incidentally, in the embodiment shown in FIG. 3, the periodical arrangement direction of the grating grooves is aligned with the longitudinal direction (Z-axis direction in the drawing) of the rectangular fine regions 31a, 31b, 31c and 31d but the invention is not naturally limited to such a construction. More specifically, the grating grooves may be arranged periodically in the horizontal direction of the sheet of the drawing (Y-axis direction in the drawing) or also be arranged periodically along a slanting direction inclined at a predetermined angle of inclination to the horizontal direction (Y-axis direction in the drawing) or perpendicular direction (Z-axis direction in the drawing).

As for the width L of the rectangular fine regions 31a, 31b, 31c and 31d, too, the width L need not at all be a constant value but may well be changed from region to region.

Embodiment 2

Figure 5:
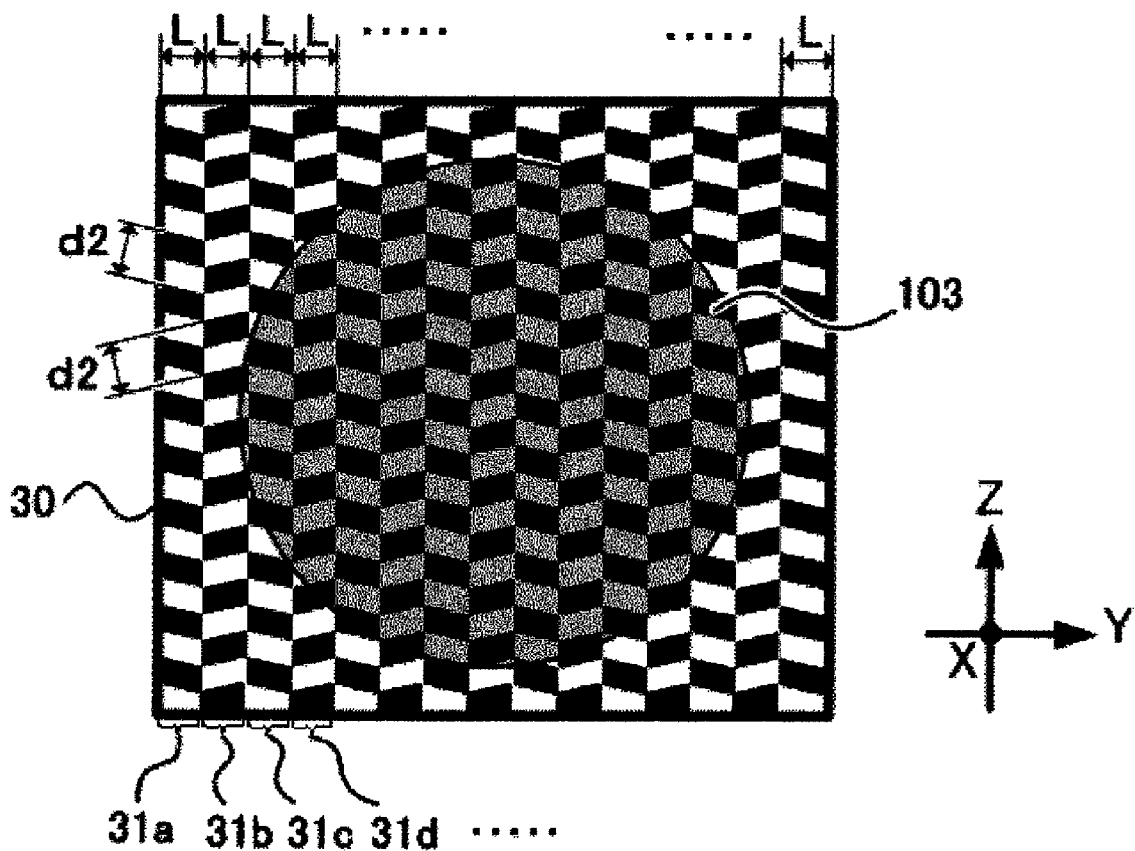
FIG. 5 is a schematic plan view showing a grating groove pattern of a diffraction grating according to a second embodiment of the invention.

FIG. 5 shows a grating groove pattern of the diffraction grating 30 according to the second embodiment. In this embodiment, the grating surface is divided into rectangular fine regions 31a, 31b, 31c and 31d in the same way as in the diffraction grating 30 of the first embodiment shown in FIG. 3. However, the second embodiment is different from the first embodiment in that the grating grooves to be disposed inside each fine region are arranged periodically in an oblique direction inclined at a predetermined angle of inclination to the horizontal (Y-axis direction in FIG. 5) or perpendicular (Z-axis direction in FIG. 5) to the sheet of the drawing and this periodical arrangement direction is alternately change among the adjacent pairs of fine regions.

According to such a grating groove pattern, four stray optical spots and four detected optical spots separated in the horizontal direction (Y-axis direction in FIG. 4) and the perpendicular direction (Z-axis direction in FIG. 4) to the sheet of the drawing are illuminated as the optical spots onto the light reception surface of the optical detector 41.

According to this construction, the light power change region resulting from the interference between the detected optical spot and the stray optical spot on the light reception surface of each optical detector can be further rendered fine in comparison with the first embodiment and averaging and smoothing of the light power change can be further improved. As a result, the undesirable change component of the detection signal and the noise component can be removed more satisfactorily.

Embodiment 3

Figure 6:
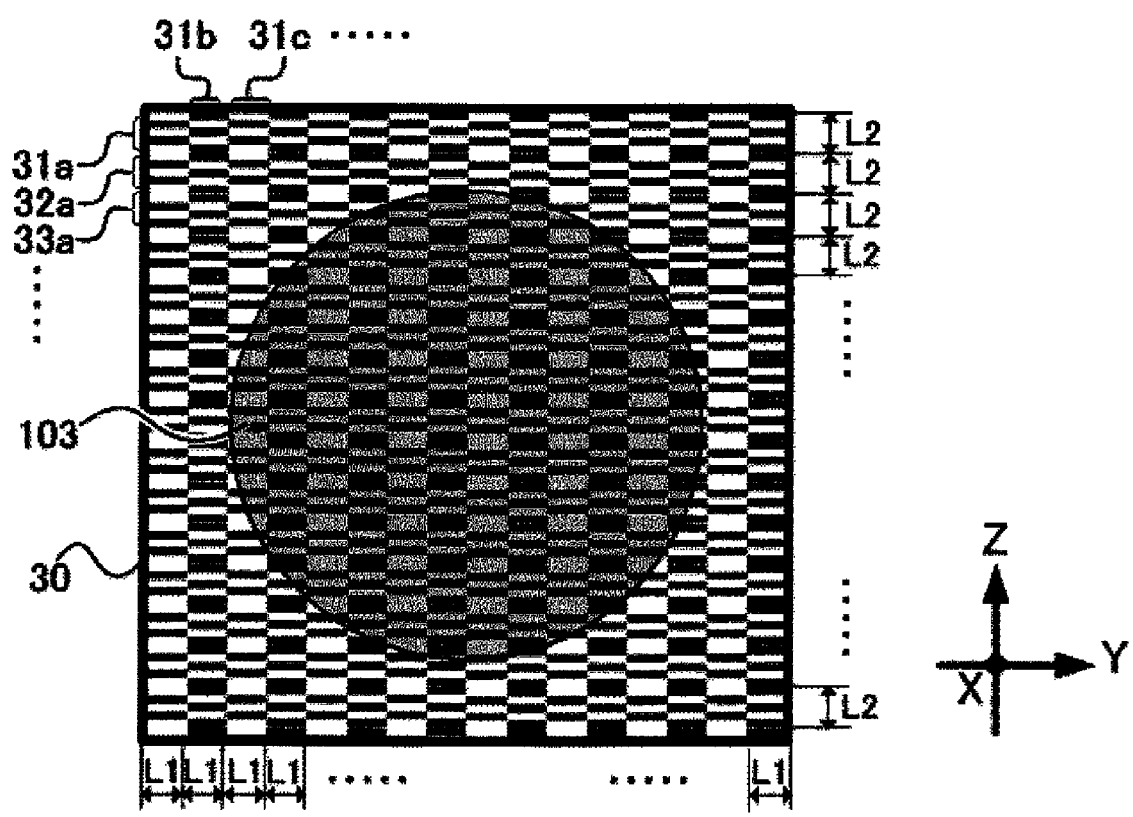
FIG. 6 is a schematic plan view showing a grating groove pattern of a diffraction grating according to a third embodiment of the invention.

FIG. 6 shows a grating groove pattern of the diffraction grating 30 according to the third embodiment. In this embodiment, the grating surface is divided into rectangular fine regions having a width L1 in the horizontal direction of the sheet of the drawing (Y-axis direction in FIG. 6) and a width L2 in the perpendicular direction (Z-axis direction in FIG. 6) or square fine regions (L1=L2), unlike the embodiments shown in FIGS. 3 and 5.

Concavo-convex grating grooves are disposed in a predetermined grating groove cycle in each fine region. These grating grooves are arranged in such a fashion that their phase is deviated alternately by a ½ cycle between adjacent pairs of fine regions in the horizontal direction (Y-axis direction in FIG. 6) and in the perpendicular direction (Z-axis direction in FIG. 6).

According to such a grating groove pattern, the concavo-convex state corresponding substantially to the ½ wavelength is formed on the wave front of ±1-order diffracted light immediately after it passes through the diffraction grating 30 in such a fashion as to expand two-dimensionally. (In the foregoing embodiments shown in FIGS. 3 and 5, the concavo-convex state corresponding substantially to the ½ wavelength is formed on the wave front of ±1-order diffracted light immediately after it passes through the diffraction grating 30 in such a fashion as to expand one-dimensionally).

Therefore, the light power change region resulting from the interference between the detected optical spot and the stray optical spot on the light reception surface of each optical detector is rendered finer than in the first and second embodiments and averaging and smoothing of the light power change can be further improved. As a result, the undesirable change component of the detection signal and the noise component can be removed more satisfactorily.

The first to third embodiments given above assume that the diffraction grating 30 has diffraction efficiency such that light power of the so-called "0-order beam" passing as such through the diffraction grating 30 becomes substantially zero (0). Quite naturally, however, the invention is not specifically limited to the diffraction gratings having such a function but can be applied to those diffraction gratings in which light power of the 0-order beam is not zero. Nonetheless, it is preferred in the invention that light power of the ±1-order diffraction optical beam has a sufficiently greater value than light power of this 0-order optical beam.

Embodiment 4

Figure 7:
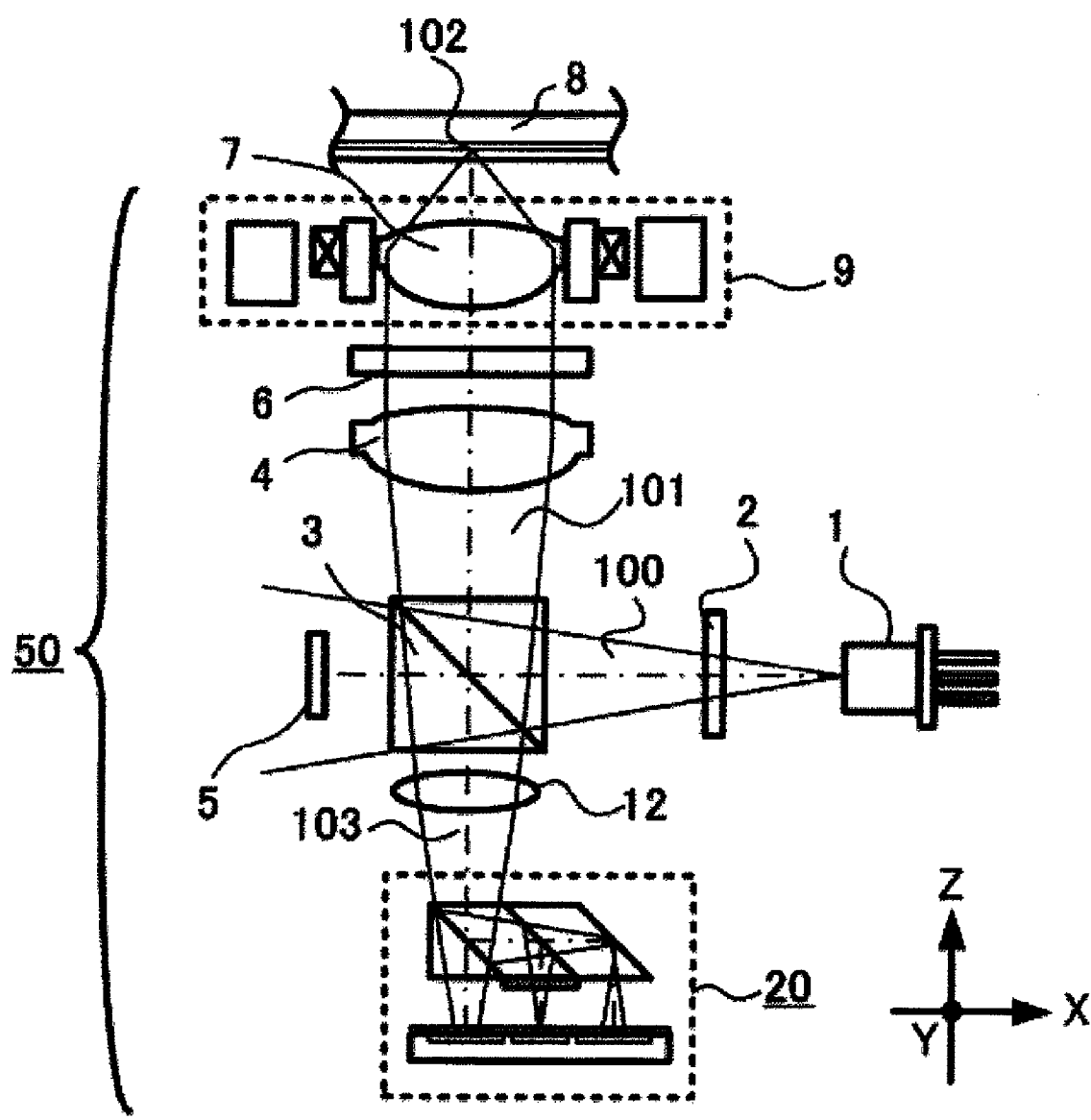
FIG. 7 is a schematic front view showing an optical pickup according to the second embodiment.

FIG. 7 shows a rough construction of an optical system of an optical pickup 50 according to the fourth embodiment of the invention. In the drawing, like reference numerals are used to identify like constituents as in the first embodiment shown in FIG. 1. In this embodiment, the optical system of the outgoing optical path ranging from the semiconductor laser optical path 1 to the optical disc 8 and the optical system of the return optical path ranging from the reflection from the optical disc 8 to the PBS 3 are exactly the same as those of the first embodiment shown in FIG. 1 and their detailed explanation will be omitted.

Figure 8:
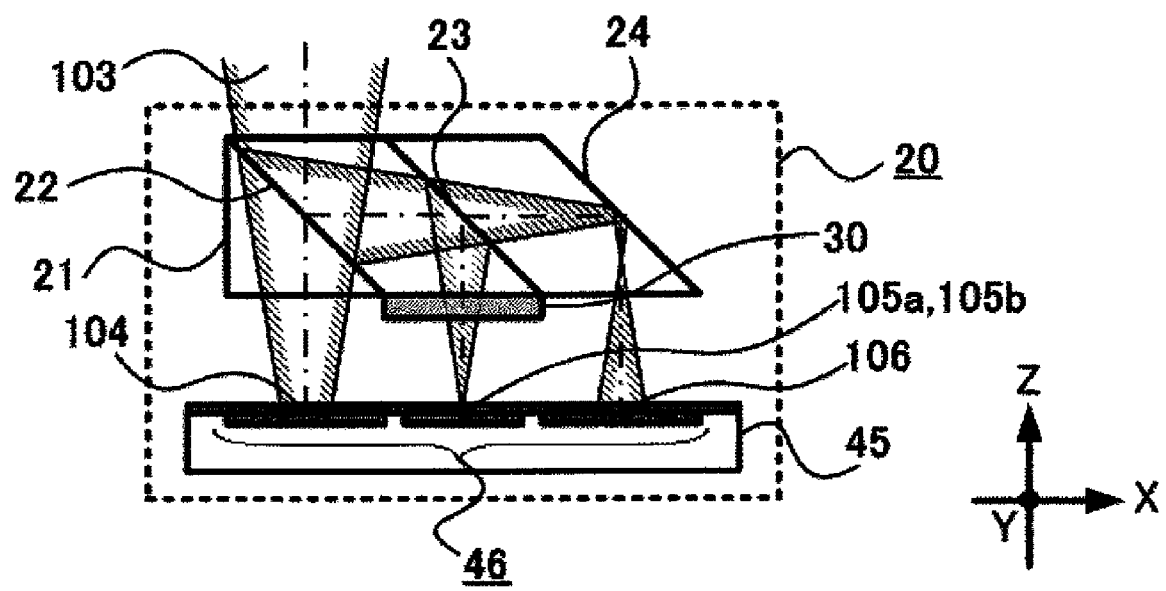
FIG. 8 is a schematic front view showing in enlargement main portions of the optical pickup in the second embodiment.

The return path optical beam reflected from the optical disc 8 and reaching the PBS 3 passes through the PBS 3, is then converted by the detection lens 12 to a predetermined detected optical beam 103 and is incident into a signal detection optical block 20. FIG. 8 is an explanatory view that shows in enlargement a concrete construction of the optical block 20 by extracting only the optical block 20 for explaining its function. The explanation will be given with reference to this drawing.

The signal detection optical block 20 includes a compound prism 21, the diffraction grating 30 and an optical detector 45 having a plurality of light reception surfaces 46.

Half mirror surfaces 22 and 23 are juxtaposed with each other inside the compound prism 21. Each of the half mirror surfaces 22 and 23 is inclined at about 45° with respect to the optical axis of the incident optical beam and has the function of reflecting and transmitting the incident optical beam at a predetermined reflection factor and a predetermined transmission factor, respectively. Furthermore, a total reflection surface 24 is so arranged as to be in juxtaposition with the half mirror surfaces.

The diffraction grating 30 has exactly the same construction and the same function as the diffraction grating explained in detail in the first to fourth embodiments.

Figure 9:
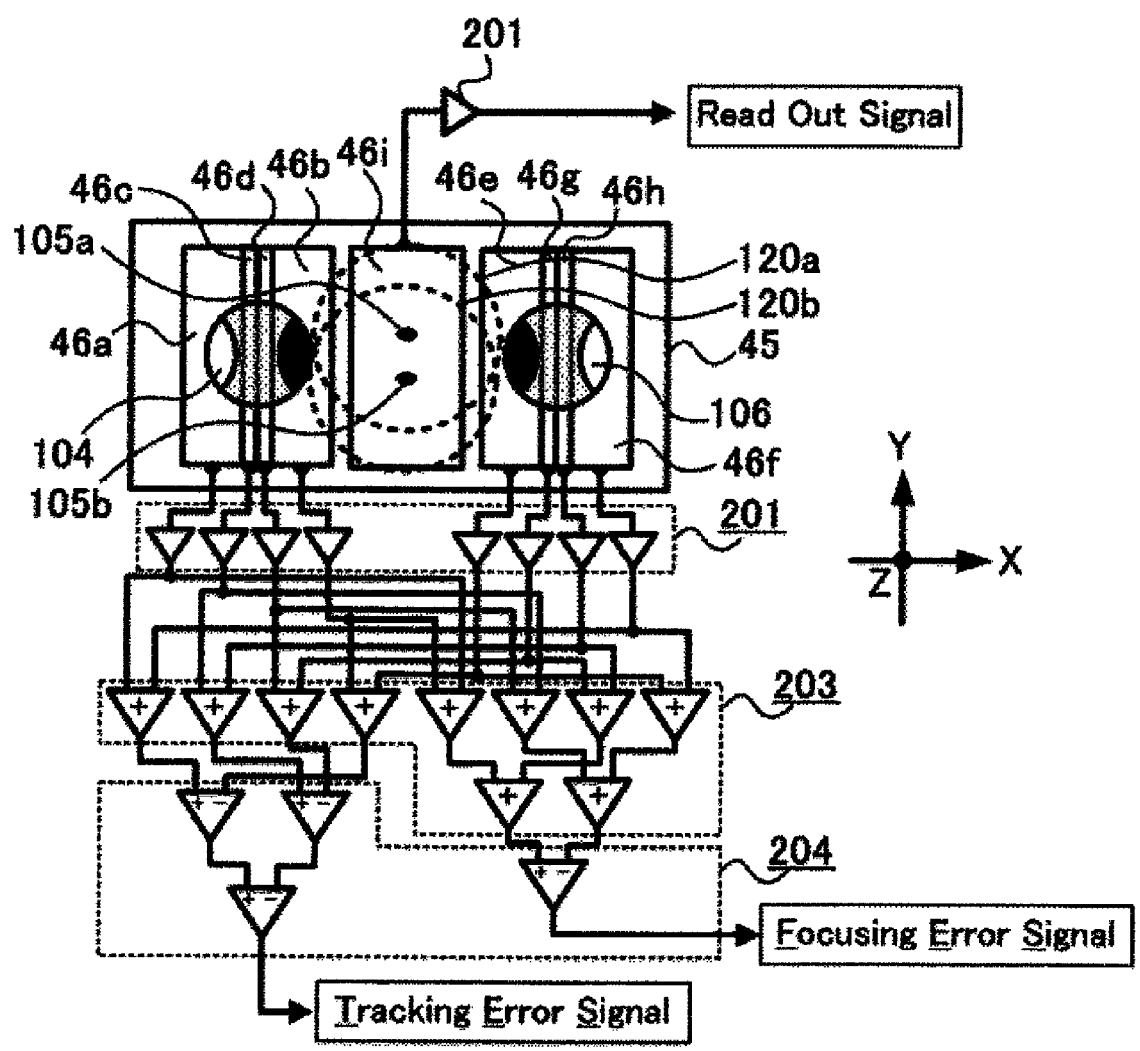
FIG. 9 is a plan view showing a shape of a light reception surface of optical detectors used in the optical pickup in the second embodiment, their arrangement pattern and the outline of an operation circuit of detection signals.

Nine independent light reception surfaces 46a to 46i in all are arranged as the light reception surfaces inside the optical detector 45. Incidentally, FIG. 9 is a schematic plan view that shows a schematic shape of each light reception surface and its arrangement state together with a block diagram of an operation circuit.

The detected optical beam 103 outgoing from the detection lens 12 is first incident into the half mirror surface 22 inside the compound prism 21 and the optical beam of a part of light power passes through this half mirror surface 22, is incident to 4-split light reception surfaces 46a, 46b, 46c and 46d inside the optical detector 45 (see FIG. 9) and forms the detected optical spot 104.

On the other hand, a part of the detected optical beam 103 reflected from the half mirror surface 22 is next incident into the half mirror surface 23 and the optical beam of a part of its light power is reflected from this half mirror surface 23 and reaches the diffraction grating 30, where it is split into the two optical beams. These optical beams are converged on the center light reception surface 46i inside the optical detector 45 and form the detected optical spots 105a and 105b. At this time, the stray optical spots 120a and 120b are also illuminated to the light reception surface 46i under the state where they overlap with the detected optical spots 105a and 105b but the concrete principle, mechanism, etc, have already been explained in detail in the first to third embodiment and repetition of the explanation is omitted.

The optical beam of a part of light power transmitting through the half mirror 23 is reflected from the total reflection surface 24, is then incident into the 4-split light reception surfaces 46e, 46f, 46g and 46h inside the optical detector 45 (see FIG. 9) and form the detected optical spot 106.

In the construction described above, the second optical path length extending from the half mirror surface 22 to the center light reception surface 46i of the optical detector 45 through the half mirror surface 23 and the diffraction grating 30 is preferably an optical path length substantially between the first optical path length extending from the half mirror surface 22 to the 4-split light reception surfaces 46a, 46b, 46c and 46d inside the optical detector 45 through the half mirror surface 22 and the third optical path length extending from the half mirror surface 22 to the 4-split light reception surfaces 46e, 46f, 46g and 46h inside the optical detector 45 through the half mirror surface 23 and the total reflection surface 24.

Incidentally, each of the photoelectric conversion signals obtained from each light reception surface inside the detector 45 is subjected to current-voltage conversion by a current-voltage conversion circuit block 201 as shown in FIG. 9 and then to a predetermined processing by an addition circuit block 203 and a subtraction circuit block 204 and a predetermined control signal and an information reproduction signal are detected.

That is, a focusing error signal (hereinafter called "FES" for short) is obtained in a spot size detection method (hereinafter called "SSD method" for short) by the following processing and then a tracking error signal (hereinafter called "TES" for short) is obtained in a 1-beam differential push-pull method (hereinafter called "1-beam DPP method" for short):

$$FES = (Sa+Sb+Sg+Sh)-(Sc+Sd+Se+Sf) \quad (1)$$

$$TES = (Sa-Sb+Sg-Sh)-(Sc-Sd+Se-Sf) \quad (2)$$

In the equations given above, symbols Sa to Sh represent those detection signals which are independently obtained from the light reception surfaces 46a to 46h, respectively. Since the SSD method and the 1-beam DPP method are known control signal detection methods, their explanation in detail will be omitted.

The information readout signal is detected from the photoelectric conversion signal obtained from the light reception surface 46i through the current-voltage conversion circuit 201. Needless to say, the unnecessary change component and the noise component resulting from the stray optical beams from the reproduction non-object layer of the multi-layered optical disc are removed satisfactorily owing to the effects of the diffraction grating 30 of the invention arranged immediately ahead of the light reception surface.

The feature of this embodiment resides in that the detection optical systems can be put together into one system unlike the first embodiment shown in FIG. 1. In other words, when the signal detection optical block 20 of this embodiment is employed, it becomes possible to eliminate the necessity for separately arranging the optical detector for detecting the detection control signal and the optical detector for reading out the information signal and the necessity for the optical devices for splitting the detection optical beam into two directions (such as the half mirror 10 in the embodiment shown in FIG. 1). In consequence, this embodiment is extremely advantageous for reducing the size and the cost of the optical pickup.

The embodiment shown in FIGS. 7 to 9 employs the construction in which only the detected optical beam incident into the light reception surface 46i for reading out the information signal passes through the diffraction grating 30 of the invention. Quite naturally, however, the invention is not particularly limited to such a construction. In the embodiment shown in FIG. 8, for example, each of the detected optical beams incident into the light reception surface for detecting the control signal can be allowed to pass through the diffraction grating 30 by arranging the diffraction grating 30 in such a fashion as to cover the entire bottom surface of the compound prism 21. Adverse influences of the stray optical beams of the multi-layered disc can be removed satisfactorily from each control signal obtained from these detected optical beams.

Furthermore, the invention is not naturally limited to the construction of the optical pickup of the first embodiment shown in FIG. 1 and the optical pickup of the fourth embodiment shown in FIGS. 7 to 9. The invention has its aim at satisfactorily removing the influences of the stray optical beams of the multi-layered optical disc by arranging the diffraction grating having the specific construction and the specific function described above in the detection optical path of arbitrary optical pickups and limits in no way the construction of the optical system of the optical pickups.

Embodiment 5

Figure 10:
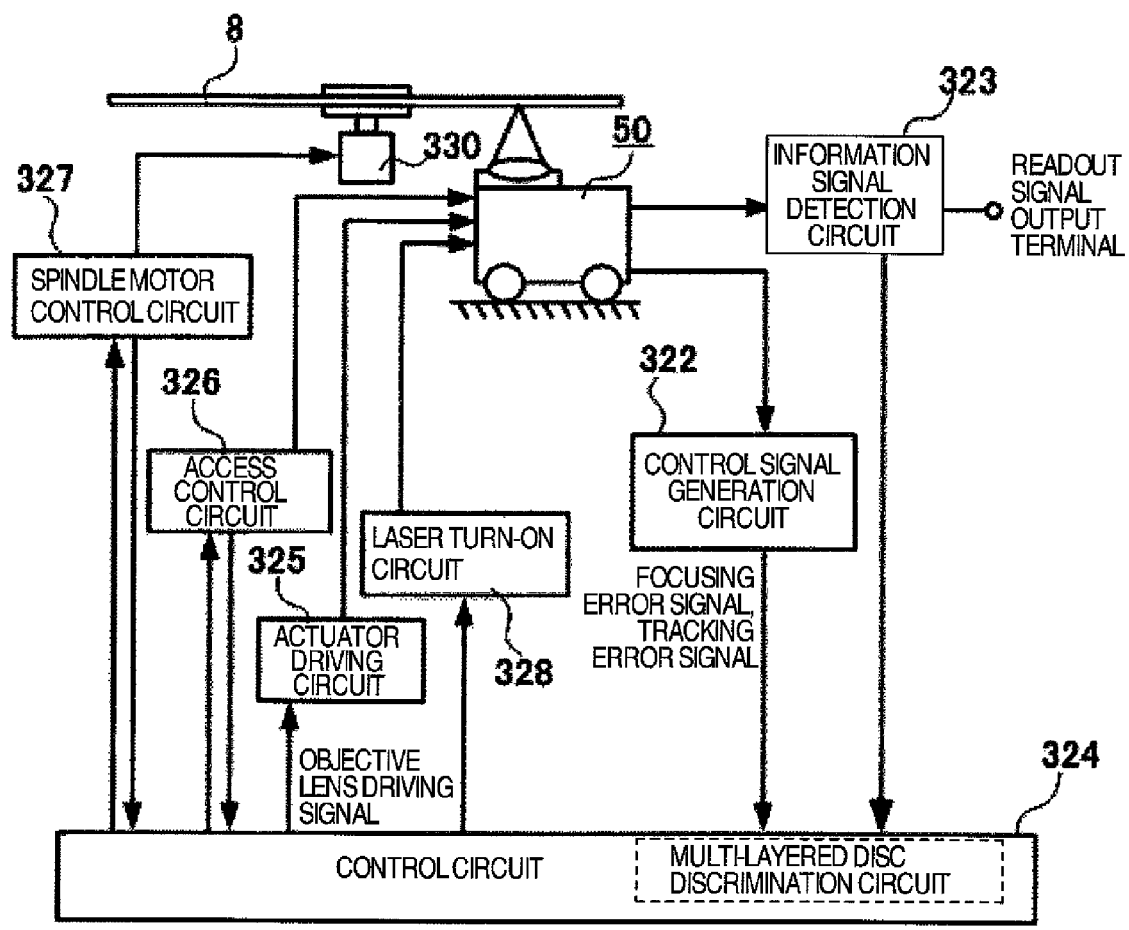
FIG. 10 is a block diagram showing the outline of an optical disc device having the optical pickup of the invention mounted thereto.

Next, FIG. 10 is a rough block diagram of an optical disc device to which the optical pickup 50 of the embodiment of the invention is mounted.

A part of the detection signals detected by the optical pickup 50 is sent to a control signal generation circuit 322 or an information signal readout circuit 323. The control signal generation circuit 322 generates a focusing error signal and a tracking error signal from each detection signal obtained by the optical pickup 50 and sends them to a control circuit 324.

On the other hand, the information signal read out (generation) circuit 323 reads out the information signal recorded to the optical disc 8 from the detection signal obtained from the optical pickup 50 and outputs the readout (information) signal to a readout signal output terminal. A part of the information signals read out is sent to the control circuit 324.

The control circuit 324 has a built-in multi-layered disc discrimination circuit for discriminating whether the optical disc 8 is an ordinary single-layered disc or multi-layered disc and which is the present readout object layer when the disc is the multi-layered disc. An objective lens driving signal and a predetermined optical component driving signal are generated from the readout object layer discrimination signal obtained from this multi-layered disc discrimination circuit, the focusing error signal generated by the control signal generation circuit 322 described above, the tracking error signal, and so forth, and are sent to an actuator driving circuit 325. The actuator driving circuit 325 drives an objective lens actuator and actuators of other necessary optical components on the basis of these signals and executes position control of the objective lens 7 and jump between the readout layers.

The control circuit 324 has also the function of executing access direction position control of the optical pickup 50 through the access control circuit 326 and rotation control of a spindle motor 330 through a spindle motor control circuit 327. Furthermore, the control circuit 324 materializes the recording/reproduction operation in the optical disc device by driving a laser turn-on circuit 328 and appropriately turning on a semiconductor laser 1 mounted to the optical pickup 50.

A reproduction apparatus of the optical disc can be constituted by combining an information signal readout unit for reading out the information signal from the signals outputted from the optical pickup 50 and an output unit for outputting the signals outputted from the information signal readout unit. A recording apparatus can be constituted, too, by combining an information input unit for inputting the information signals and a recording signal generation unit for generating signals to be recorded to the optical disc from the information inputted from the information input unit and outputting the resulting signal to the optical pickup 50.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup including a semiconductor laser source, an objective lens for converging laser beam fluxes emitted from said semiconductor laser source to a predetermined recording layer provided inside an optical information recording medium, and an optical detector for independently receiving main luminous fluxes and sub-luminous fluxes reflected from said recording layer and detecting a predetermined signal, and a diffraction grating is interposed in an optical path between said objective lens and said optical detector, said diffraction grating comprising:

a plurality of continuous grooves arranged periodically in a predetermined cycle and in a predetermined groove depth, wherein a grating surface of said diffraction grating is divided into a plurality of fine regions having a predetermined shape and said continuous grooves inside each of said fine regions is formed in such a fashion that a phase thereof is deviated by a predetermined quantity or unintentionally among adjacent ones of said fine regions; and wherein each of said fine regions is a rectangular region having a predetermined width and is arranged in such a fashion that a longitudinal direction of each of said rectangular fine regions is substantially parallel to each other.

2. An optical disc device including said optical pickup according to claim 1, and having the function of reproducing information signals recorded to a plurality of recording layers disposed with predetermined gaps among them inside an optical information recording medium by said optical pickup or recording said information signals to said recording layers.

3. An optical pickup including a semiconductor laser source, an objective lens for converging laser beam fluxes emitted from said semiconductor laser source to a predetermined recording layer provided inside an optical information recording medium, and an optical detector for independently receiving main luminous fluxes and sub-luminous fluxes reflected from said recording layer and detecting a predetermined signal, and a diffraction grating is interposed in an optical path between said objective lens and said optical detector, said diffraction grating comprising:

a plurality of continuous grooves arranged periodically in a predetermined cycle and in a predetermined groove depth, wherein a grating surface of said diffraction grating is divided into a plurality of fine regions having a predetermined shape and said continuous grooves inside each of said fine regions is formed in such a fashion that a phase thereof is deviated by about ½ of said cycle among adjacent ones of said fine regions;

wherein each of said fine regions is a rectangular region having a predetermined width and is arranged in such a fashion that a longitudinal direction of each of said rectangular fine regions is substantially parallel to each other.

4. An optical disc device including said optical pickup according to claim 3, and having the function of reproducing information signals recorded to a plurality of recording layers disposed with predetermined gaps among them inside an optical information recording medium by said optical pickup or recording said information signals to said recording layers.

* * * * *